F. W. GLYMPS.
LIFTER.
APPLICATION FILED AUG. 24, 1909.
957,463.
Patented May 10, 1910.
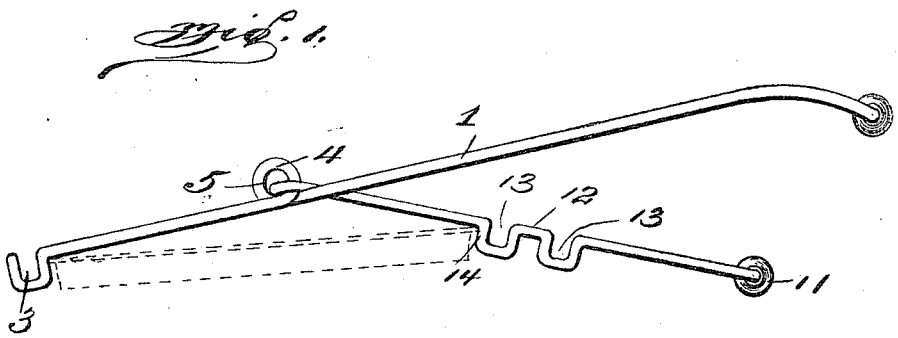
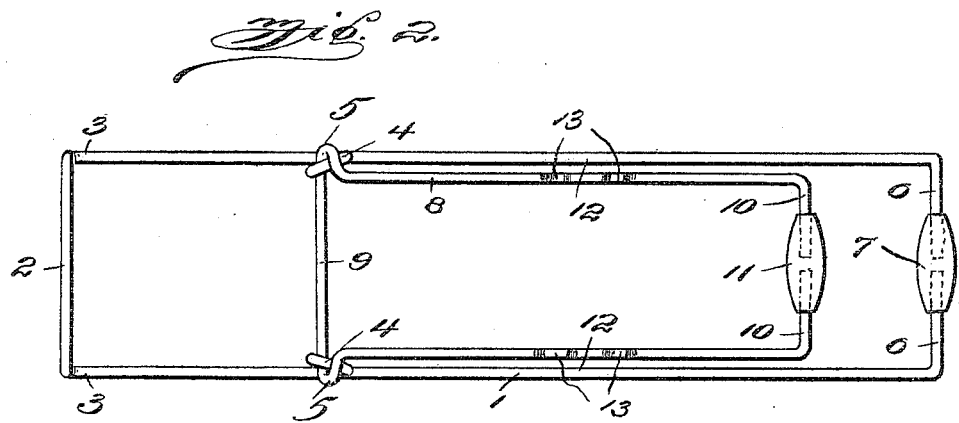
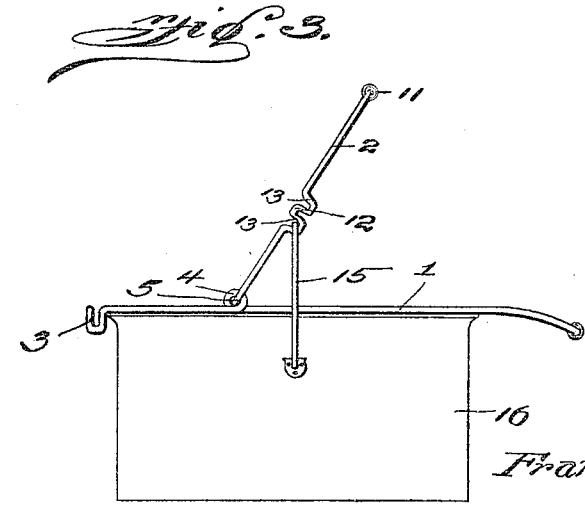
Inventor
Frank W. Glympe.
Witnesses
By Victor J. Evans.
Attorney

UNITED STATES PATENT OFFICE.

FRANK W. GLYMPS, OF SHINGLEHOUSE, PENNSYLVANIA, ASSIGNOR OF NINE-TENTHS TO E. E. PETERSON, OF SHINGLEHOUSE, PENNSYLVANIA AND G. M. CORWIN, OF OSWAYO, PENNSYLVANIA.

LIFTER.

957,463.  Specification of Letters Patent.  Patented May 10, 1910.

Application filed August 24, 1909. Serial No. 514,345.

*To all whom it may concern:*

Be it known that I, FRANK W. GLYMPS, a citizen of the United States, residing at Shinglehouse, in the county of Potter and State of Pennsylvania, have invented new and useful Improvements in Lifters, of which the following is a specification.

This invention relates to lifters, the object of the invention being to provide a lifting device for handling pie plates, kettles and the like, being designed to facilitate the insertion and removal of pie plates in an oven and the lifting and tilting of kettles in order to drain off the liquid contents thereof. The device is also susceptible of other uses which will readily suggest themselves.

To the above end, the invention consists of a lifter of the class described embodying certain novel features and details of construction and relative arrangement of parts as will be hereinafter more fully described, illustrated and claimed.

In the accompanying drawings:—Figure 1 is a side elevation of the lifter, showing a pie plate in dotted lines held thereby. Fig. 2 is a plan view of the device. Fig. 3 is a side elevation thereof, showing the relation thereof to a kettle.

The lifting device is composed of two suitable lengths of wire forming a pair of frames having a hinged connection with one another. One of these frames comprises substantially parallel side bars 1 which are connected at one end by a cross bar 2 adjacent to which the frame is formed with U-shaped hooks 3 adapted to engage the edge or rim of a pie plate or kettle, as shown, respectively, in Figs. 1 and 3. The side bars 1 at a point intermediate the length thereof are bent to form eyes 4 for the reception of oppositely projecting pintles 5 on the other frame, the said construction forming a pivotal and hinged connection between the two frames as best illustrated in Fig. 1. The side bars 1, at the end of the frame opposite the cross bar 2 are turned inward as shown at 6 and inserted in the opposite ends of a hollow or tubular handle 7. The other frame also comprises side bars 8 substantially parallel but located sufficiently closer together to enable them to lie and work between the side bars 1 of the frame above described and as clearly shown in Fig. 2. This second frame is also provided at one end with a cross bar 9 and is also bent to form the pintles 5 above referred to. At their opposite ends the side bars 8 are bent inward as shown at 10 and inserted in the opposite ends of another collar or tubular handle 11, a handle being thus provided with each of the frames. At a point intermediate their length, the side bars 8 are crimped as shown at 12 thereby forming notches 13 and shoulders 14, the shoulders 14 being adapted to engage the opposite side of a pie plate or the like, as indicated in Fig. 1, while the notches 13 are adapted to receive and engage the bail 15 of a kettle 16 as shown in Fig. 3.

I claim:—

A device of the class described comprising two oblong open center frames each composed of wire, one frame being bent to form eyes and the other being bent to form pintles at one end which fit into said eyes and form a hinge joint between the two frames, one frame being provided at one end with a pair of notches and the other frame being provided intermediate its ends with notches, substantially as described.

In testimony whereof I affix my signature in presence of two witnesses.

FRANK W. GLYMPS.

Witnesses:
 DE G. VAN DE BOE,
 W. T. PALMER.